No. 739,330. PATENTED SEPT. 22, 1903.
W. H. MACK.
HORSE RELEASER.
APPLICATION FILED JULY 15, 1903.
NO MODEL.
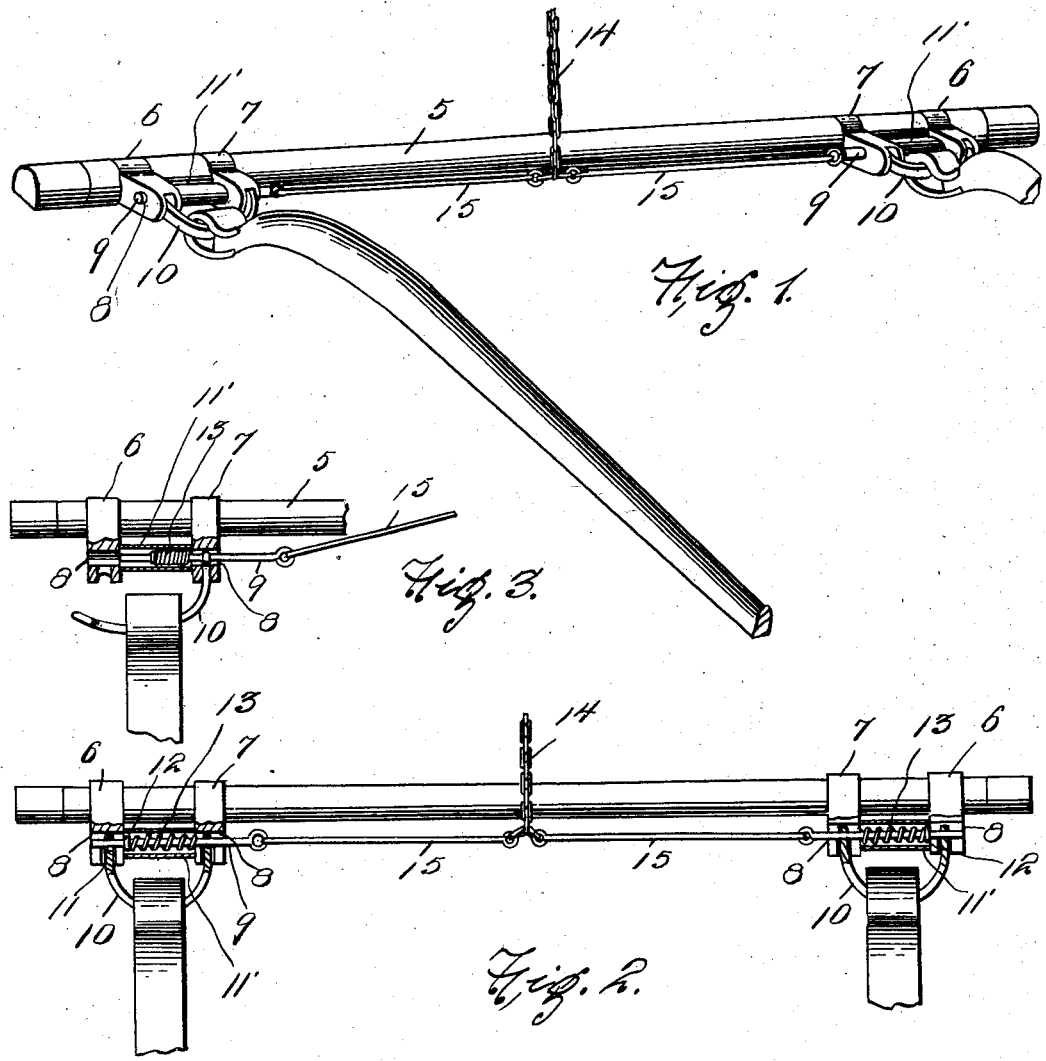

No. 739,330. Patented September 22, 1903.

UNITED STATES PATENT OFFICE.

WILLIAM H. MACK, OF MESSMORE, PENNSYLVANIA.

HORSE-RELEASER.

SPECIFICATION forming part of Letters Patent No. 739,330, dated September 22, 1903.

Application filed July 15, 1903. Serial No. 165,603. (No model.)

*To all whom it may concern:*

Be it known that I, WILLIAM H. MACK, a citizen of the United States, residing at Messmore, in the county of Fayette, State of Pennsylvania, have invented certain new and useful Improvements in Horse-Releasers; and I do hereby declare the following to be a full, clear, and exact description of the invention, such as will enable others skilled in the art to which it appertains to make and use the same.

This invention relates to horse-releasers, such as are employed for releasing runaway horses from vehicles, the object of the invention being to provide a strong and durable construction which may be easily and quickly operated to disconnect the shafts from a vehicle, but which under normal conditions will connect the shaft securely to the vehicle.

In the drawings forming a portion of this specification, and in which like numerals of reference indicate similar parts in the several views, Figure 1 is a perspective view. Fig. 2 is a view partly in top plan and partly in section. Fig. 3 is a view similar to Fig. 2, showing one shackle released to permit of drawing the shaft therefrom.

Referring now to the drawings, there is shown an axle 5, to which are connected adjacent to each end a pair of laterally-spaced housings 6 and 7. Formed laterally through the housings 6 and 7 of each pair of housings are alining perforations 8, in which is slidably engaged a bolt 9, which is in front of and parallel with the axle 5.

A pair of U-shaped shackles 10 are employed, the ends of each shackle being disposed in the housings 6 and 7 at one end of the axle and having perforations therethrough, as shown at 11, which receive the bolts 9, so that said shackles are held against withdrawal from the housings.

Between each pair of housings 6 and 7 and inclosing the corresponding bolt 9 is a tubular casing 11', and upon each bolt is fixed a collar 12, between which and the innermost housing 6 is disposed a helical spring 13, which encircles the bolt and serves to hold the latter projected or with its outer end passed through the housing 7. When the bolts are retracted or drawn toward each other, they are moved from engagement with the ends of the shackles in the housings 7, and such ends of the shackles may be then drawn outwardly. The shackles are engaged through the clips at the ends of the shafts and hold the latter to the axle, and when the shackles are released at one end the shafts are drawn quickly therefrom.

To retract the bolts against the action of the springs, a chain 14 is provided and is connected with the inner ends of the bolts through the medium of the rods 15. Thus when the chain is drawn upwardly the rods will be correspondingly moved at their inner ends and will serve to draw the bolts and release the shackles, as above described.

What is claimed is—

In a horse-releaser the combination with an axle having a pair of laterally-spaced housings at each end having alining transverse perforations therethrough, and having openings extending inwardly and connecting with the transverse perforations, of a bolt engaged through the perforations of each pair of housings and movable slidably therefrom, each bolt having a fixed collar between the housing, a helical spring disposed upon each bolt between the collar and the inner housing, a casing disposed between the housings and adapted to inclose each bolt and its spring, a U-shaped shackle for each pair of housings its ends adapted to receive in the openings of said housings and perforated to receive the corresponding bolt, and a single means connected with the bolts for withdrawing them.

In testimony whereof I affix my signature in presence of two witnesses.

WILLIAM H. MACK.

Witnesses:
 ROY F. KNOTTS,
 MILTON MORRIS.